United States Patent
Chu et al.

(10) Patent No.: US 9,674,661 B2
(45) Date of Patent: Jun. 6, 2017

(54) DEVICE-TO-DEVICE RELATIVE LOCALIZATION

(75) Inventors: David Chiyuan Chu, Redmond, WA (US); Xiangying Meng, Beijing (CN); Thomas Moscibroda, Beijing (CN); Jian Qiu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/279,137

(22) Filed: Oct. 21, 2011

(65) Prior Publication Data

US 2013/0102324 A1 Apr. 25, 2013

(51) Int. Cl.
*H04W 4/00* (2009.01)
*H04W 4/02* (2009.01)

(52) U.S. Cl.
CPC .......... *H04W 4/023* (2013.01); *H04W 4/008* (2013.01)

(58) Field of Classification Search
CPC ............................. H04W 4/008; H04L 67/18
USPC .............. 455/456.3, 457, 456.1–456.6
See application file for complete search history.

(56) References Cited

U.S. PATENT DOCUMENTS

| | | | |
|---|---|---|---|
| 6,819,286 B2 | 11/2004 | Armbruster et al. | |
| 7,047,022 B2 | 5/2006 | Aoyama | |
| 7,171,233 B2 | 1/2007 | Sanchez | |
| 7,577,441 B2 * | 8/2009 | Nonoyama | 455/456.1 |
| 7,904,244 B2 * | 3/2011 | Sugla | G01C 21/00 342/451 |
| 2003/0110291 A1 | 6/2003 | Chen | |
| 2003/0119523 A1 * | 6/2003 | Bulthuis | 455/456 |
| 2003/0134647 A1 | 7/2003 | Santhoff | |
| 2004/0120278 A1 | 6/2004 | Krantz et al. | |
| 2004/0147223 A1 | 7/2004 | Cho | |

(Continued)

FOREIGN PATENT DOCUMENTS

| | | |
|---|---|---|
| WO | WO0157547 A1 | 8/2001 |
| WO | WO0158098 A2 | 8/2001 |

OTHER PUBLICATIONS

Aarabi, "Self-localizing dynamic microphone arrays," Proceedings: IEEE Transactions on Systems, Man, and Cybernetics—Part C: Applications and Reviews, vol. 32, No. 4, Published Nov. 2002, retrieved at <<http://ieeexplore.ieee.org/stamp/stamp.jsp?tp=&arnumber=1176896>>, pp. 474-485.

(Continued)

*Primary Examiner* — Joshua Schwartz
(74) *Attorney, Agent, or Firm* — Lee & Hayes, PLLC

(57) ABSTRACT

Techniques for generating a real-time 3D position of one device relative another device are described herein. In one embodiment, a first device may be equipped with one or more transmitters and receivers to collect location information based on direct localized signal transmission between the first device and a second device. The first device may also be equipped with an accelerometer and/or digital compasses to assist in resolving ambiguous locations when the first device and the second device are not at an alignment position. Each device may transmit part or all of its collected location information to another device to assist in obtaining the relative location. Alternatively, a separate server may receive the location information from the devices and calculate the relative location of each device based on the received location information.

20 Claims, 12 Drawing Sheets

(56) References Cited

U.S. PATENT DOCUMENTS

| | | | |
|---|---|---|---|
| 2004/0192219 | A1 | 9/2004 | Malone et al. |
| 2004/0192331 | A1 | 9/2004 | Gorday et al. |
| 2005/0143101 | A1 | 6/2005 | Kyperountas et al. |
| 2005/0221813 | A1 | 10/2005 | Rajahalme et al. |
| 2006/0166681 | A1* | 7/2006 | Lohbihler ............... G01S 5/02 455/456.2 |
| 2006/0234631 | A1 | 10/2006 | Dieguez |
| 2006/0245601 | A1 | 11/2006 | Michaud et al. |
| 2008/0071713 | A1 | 3/2008 | Tung |
| 2008/0216125 | A1 | 9/2008 | Li et al. |
| 2009/0233622 | A1* | 9/2009 | Johnson ............... H04W 64/00 455/456.3 |
| 2010/0004005 | A1* | 1/2010 | Pereira et al. ............... 455/457 |
| 2011/0091055 | A1 | 4/2011 | LeBlanc |
| 2011/0241935 | A1* | 10/2011 | Miocinovic et al. .... 342/357.31 |

OTHER PUBLICATIONS

Ajdler et al., "Acoustic source localization in distributed sensor networks," Proceedings: Signals, Systems and Computers, vol. 2., 2004, retrieved at <<http://ieeexplore.ieee.org/stamp/stamp.jsp?tp=&arnumber=1399368>>, pp. 1328-1332.

Aytekin et al., "The bat headrelated transfer function reveals binaural cues for sound localization in azimuth and elevation," J Acoust Soc Am, Dec. 2004, retrieved at <<http://www.bsos.umd.edu/psyc/batlab/publication/The%20head-related%20transfer%20funcion%20reveals%20binaural%20cues.pdf>>, 2004, pp. 3594-3605.

Bechler et al., "System for robust 3D speaker tracking using microphone array measurements," Proceedings: IROS 2004, Intelligent Robots and System, Sep. 28-Oct. 2, 2004, retrieved at <<http://ieeexplore.ieee.org/stamp/stamp.jsp?tp=&arnumber=1389722>>, pp. 2117-2122.

Begault et al., "3-D Sound for Virtual Reality and Multimedia," Academic Press Professional, Inc., San Diego, CA, USA, 1994, retrieved at <<http://www.macs.hw.ac.uk/modules/F24VS2/Resources/Begault_2000_3d_Sound_Multimedia.pdf>>, 246 pages.

Bian et al., "Using Sound Source Localization in a Home Environment," In Pervasive, 2005, retrieved at <<http://www.sps.ele.tue.nl/members/O.Amft/teaching/UCAR/Bian2005-P_Pervasive.pdf>>, pp. 19-36.

Chen et al., "A Spatial Feature Extraction and Regularization Model for Virtual Auditory Display," In ICASSP '93, 1993, retrieved at <<http://ieeexplore.ieee.org/stamp/stamp.jsp?arnumber=00319072>>, pp. 1-129-1-132.

Cheng et al., "Introduction to Head-related Transfer Functions (HRTFs): Representations of HRTFs in Time, Frequency, and Space," In Audio Engineering Society Convention 107, Sep. 1999, retrieved at <<http://505606.pbworks.com/f/HRTF.pdf>>, pp. 231-249.

Girod et al., "A Self-Calibrating Distributed Acoustic Sensing Platform," In SenSys, Nov. 1-3, 2006, retrieved at <<http://www.vladtrifa.com/research/files/Girod06b.pdf>>, 2 pages.

Harter et al., "The Anatomy of a Context-aware Application," Wireless Networks, 2002, retrieved at <<http://www.cl.cam.ac.uk/research/dtg/Ice-pub/public/files/tr.2002.2.pdf>>, 15 pages.

Klee et al., "Kalman filters for time delay of arrival-based source localization," Proceedings: EURASIP Journal on Applied Signal Processing, Published Date: Jan. 1, 2006, retrieved at <<http://downloads.hindawi.com/journals/asp/2006/012378.pdf>>, 16 page.

LaMarca, "Location Systems: An Introduction to the Technology Behind Location Awareness," Synthesis Lectures on Mobile and Pervasive Computing, Copyright 2008 by Morgan & Claypool, 124 pages.

Lopes et al., "Localization of off-the-shelf Mobile Devices using Audible Sound: Architectures, Protocols and Performance Assessment," Mob. Comput. Commun. Rev., 2006, retrieved at <<http://luci.ics.uci.edu/predeployment/websiteContent/weAreLuci/biographies/faculty/djp3/LocalCopy/p38-lopez(2).pdf>>, pp. 38-50.

Morse et al., "Theoretical Acoustics," Princeton University Press, 1968, pp. 1-927.

Parisi et al., "Source Localization in Reverberant Environments by Consistent Peak Selection," Proceedings: Acoustics, Speech and Signal Processing, 2007, ICASSP 2007, retrieved at <<http://ieeexplore.ieee.org/stamp/stamp.jsp?tp=&arnumber=4217010>>, pp. 1-37- 1-40.

Peng et al., "BeepBeep: A High Accuracy Acoustic Ranging System using COTS Mobile Devices," In SenSys '07, Nov. 6-9, 2007, Sydney, Australia, retrieved at <<http://citeseerx.ist.psu.edu/viewdoc/download?doi=10.1.1.126.1683&rep=rep1&type=pdf>>, 14 pages.

Priyantha et al., "The Cricket Location-support System," In MOBICOM '00, Aug. 2000, retrieved at <<http://nms.lcs.mit.edu/papers/cricket.pdf>>, 12 pages.

Scott et al., "Audio Location: Accurate Low-cost Location Sensing," In Pervasive, 2005, retrieved at <<http://citeseerx.ist.psu.edu/viewdoc/download?doi=10.1.1.91.1061&rep=rep1&type=pdf>>, 18 pages.

Tashev et al., "Microphone Array Post-processor using Instantaneous Direction of Arrival," In IWAENC '06, 2006, retrieved at <<http://research.microsoft.com/pubs/76778/Tashev_IWAENC_2006_Spatial_Filter.pdf>>, 4 pages.

Wenzel et al., "Localization using Non individualized Head-related Transfer Functions," The Journal of the Acoustical Society of America, 94(1):111-123, Jul. 1993, retrieved at <<http://staffwww.itn.liu.se/~karlu/courses/TNM086/papers/wenzel_1993_Localization_Head_Related.pdf>>, pp. 111-123.

Forno et al., "Design and Implementation of a Bluetooth Ad Hoc Network for Indoor Positioning," IEEE Proc. -Softw., vol. 152, No. 5, Oct. 2005. <<http://ieeexplore.ieee.org/xpl/freeabs_all.jsp?tp=&amumber=1512737&isnumber=32394>> 6 pages.

Hazas et al., "A Relative Positioning System for Co-located Mobile Devices," Proceedings of the 3rd International Conference on Mobile Systems, Applications, and Services, New York, NY, 2005 <<http://www.teco.edu/~krohn/ultrasound.pdf>> 14 pages.

Krumm et al., "The NearMe Wireless Proximity Server," UbiComp 2004. The Sixth International Conference on Ubiquitous Computing, pp. 283-300. Sep. 7-10, 2004. Nottingham, England, <<http://research.microsoft.com/users/kenh/papers/NearMe.pdf>> 18 pages.

Naya et al., "Bluetooth-based Indoor Proximity Sensing for Nursing Context Awareness," Proceedings of the 2005 Ninth IEEE International Symposium on Wearable Computers (ISWC'05) <<http://ieeexplore.ieee.org/xpl/freeabs_all.jsp?tp=&amumber=1550816&isnumber=33046>> Downloaded on Oct. 16, 2008 at 02:55 from IEEE Xplore, 2 pages.

Office Action for U.S. Appl. No. 12/395,386 mailed on Aug. 9, 2011, Sharad Agarwal, "Peer and Composite Localization for Mobile Applications," 16 pages.

Shang et al., "Improved MDS-based Localization," 2004, IEEE INFOCOM 2004 <<http://citeseerx.ist.psu.edu/viewdoc/summary?doi=10.1.58.6077>> 12 pages.

Thilliez et al., "A Localization Service for Mobile Users in Peer-to-Peer Environments," Crestani et al., (Eds.): Mobile and Ubiquitous Info. Access Ws 2003, LNCS 2954, pp. 271-282, 2004. cc Springer-Verlag Berlin Heidelberg 2004 <<http://www.springerlink.com/content/wech5ex39nrcyj6b/>> 12 pages.

Varshaysky et al., "Calibree: Calibration-Free Localization using Relative Distance Estimations," <<http://research.microsoft.com/users/jckrumm/Publications%202008/calibree.pdf>> Lecture Notes in Compute Science, 2008, vol. 5013/2008, 17 pages.

Magedanz et al., "Grips Generic Radio Based Indoor Positioning System," In the Proceedings of the Workshop on Positioning, Navigation and Communication & 1st Ultra-Wideband Expert Talk, Available at <<http://www.wpnc.net/fileadmin/WPNC05/Proceedings/GRIPS_Generic_Radio_based_Indoor_Positioning_System.pdf>> 2005, pp. 133-140.

Office Action for U.S. Appl. No. 12/395,386, mailed on Mar. 13, 2012, Sharad Agarwal, "Peer and Composite Localization for Mobile Applications," 19 pages.

(56) References Cited

OTHER PUBLICATIONS

Office action for U.S. Appl. No. 12/395,386, mailed on Jul. 19, 2013, Sharad Agarwal et al, "Peer and Composite Localization for Mobile Applications", 21 pages.
Office action for U.S. Appl. No. 12/395,386, mailed on Jan. 16, 2014, Agarwal, et al., "Peer and Composite Localization for Mobile Applications", 20 pages.

\* cited by examiner

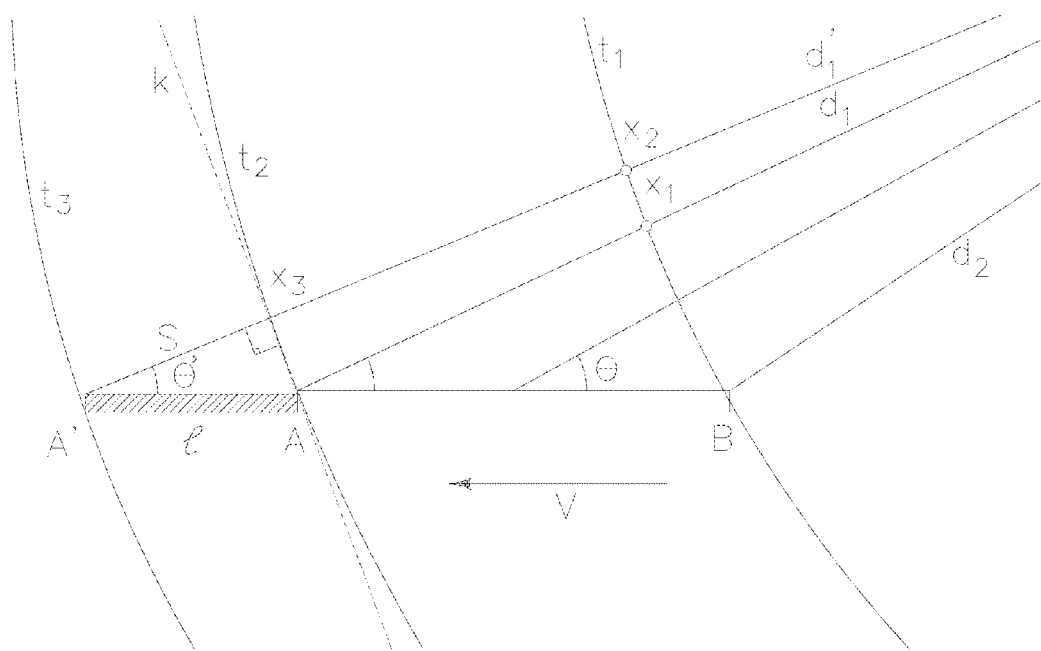
FIG. 11A TRANSLATION ERROR
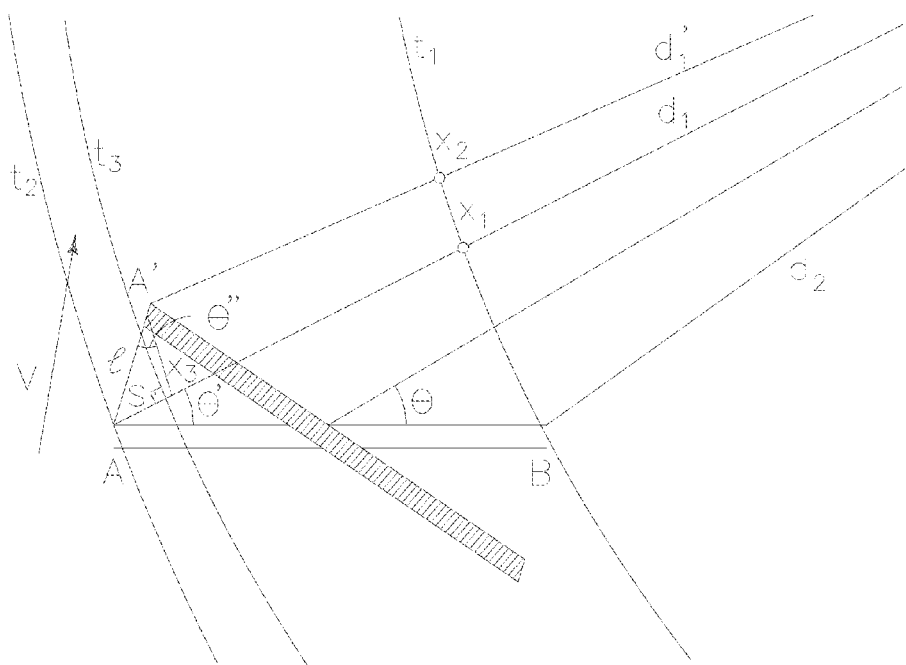
FIG. 11B ROTATION ERROR

_US 9,674,661 B2_

DEVICE-TO-DEVICE RELATIVE LOCALIZATION

BACKGROUND

Smartphones and mobile devices are becoming increasingly prevalent and sophisticated. Extensive libraries of applications have been developed for such device. However, to date, most applications allow for little if any direct device-to-device interaction, instead routing most communications between devices through a web-based service. For example, most multi-player games for mobile devices are implemented as a remote, web-based game that is accessed over a network via a thin client on each of the mobile devices. As another example, most existing applications that employ location data rely on a fixed external infrastructure, such as a global positioning system (GPS) or location service, to determine location of the mobile devices.

Some specialized gaming consoles (e.g., Microsoft Kinect™ or Nintendo Wii™) have implemented real-time localization of devices. However, such systems rely heavily on the existence of a fixed external infrastructure, such as cameras, separate external sensors, base station (e.g., set-top box), etc.

None of the existing solutions are capable of implementing real-time three-dimension (3D) relative localization between two or more handheld or mobile devices without external infrastructure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

The present disclosure describes techniques for locally determining location of one handheld device relative to another. In one embodiment, the techniques described herein may be implemented without relying on any other external infrastructure, such as an external camera, separate external sensors, base station, global positioning system (GPS), or location service, to capture location information of the devices. The techniques may use sensors of the devices themselves to collect location information of the devices, and obtain relative locations of the devices based on the collected location information. Additionally or alternatively, one device may send collected location information to another device and/or receive collected location from another device, and obtain the relative location of the other devices based on its collected and received location information.

In some embodiments, some or all of the calculation functionality to calculate the relative position based on the location information may be performed by a server separate from the devices to increase calculation efficiency. However, in such embodiments, location data may still be collected and/or received locally by the devices.

In one example, a first handheld device may emit a localized signal from a speaker, which may be detected by multiple microphones (or mics) at a second handheld device. In another example, the first handheld device may emit localized signals from multiple speakers, which may be detected by one or more mics at the second handheld device. The second handheld device may then use the detected localized signal(s) from the first handheld device to determine a relative position of the first handheld device by using, for example, triangulation techniques. The same or similar techniques may be performed in reverse for the first handheld device to determine the relative location of the second handheld device.

Additionally or alternatively, the first handheld device and/or the second handheld device may transmit accelerometer, gyroscope, and/or compass data to the other handheld device, which may also be used in determining or refining the relative positions of the handheld devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 11 illustrates measurement error caused by translational and rotational movement during an example of one-way audio tone exchange.

DETAILED DESCRIPTION

Overview

Figure 1A:
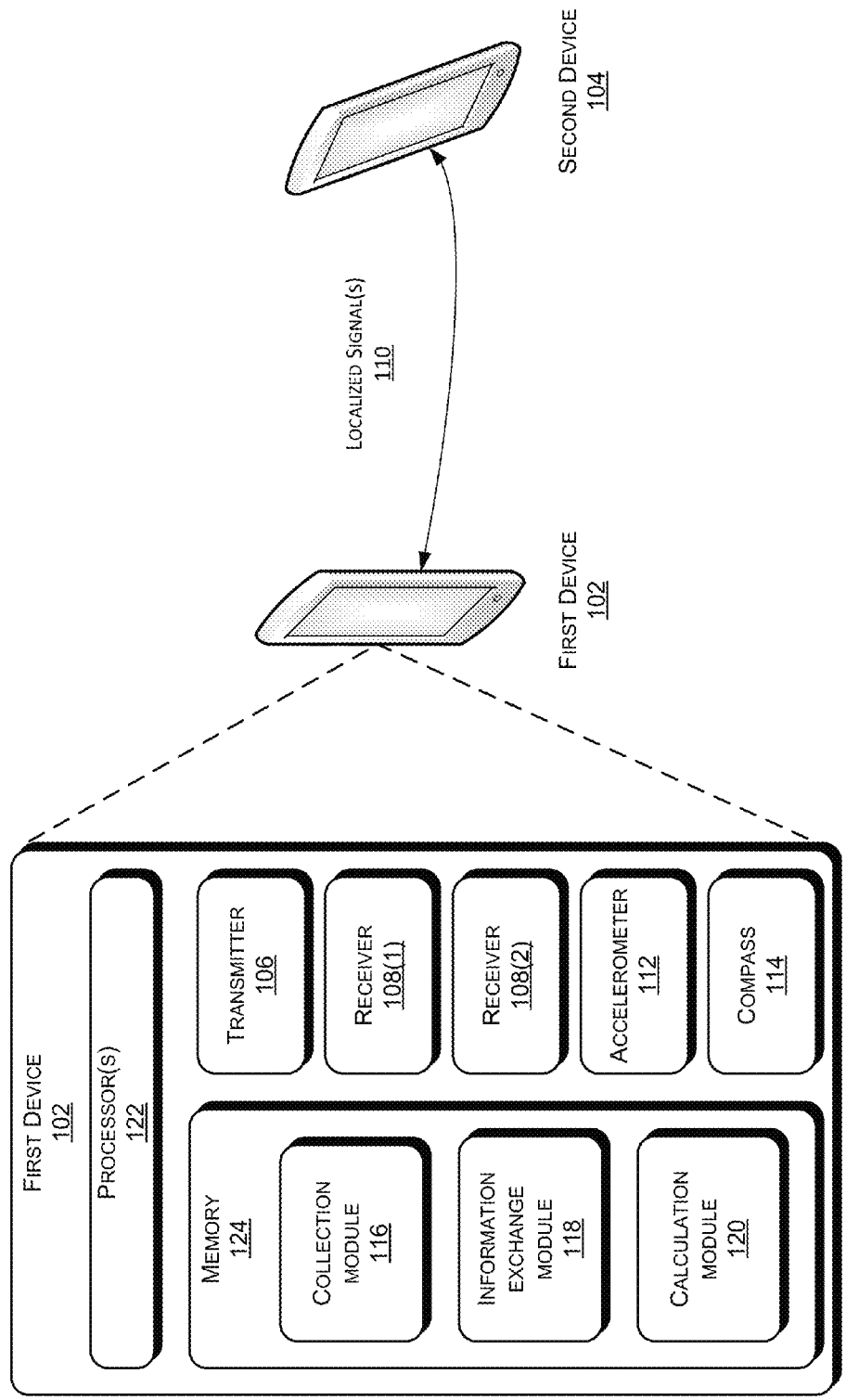
FIG. 1A illustrates an example overview of determining a location of one device relative to another, in which the devices perform calculation of the relative location.

As discussed above, the current techniques rely on fixed infrastructures external to the devices to obtain relative location information between the devices. The present disclosure describes examples of device-to-device localization that obtain relative localization based at least in part on direct communications between the devices. In various embodiments, the devices may include handheld or mobile devices (e.g., mobile phone, smartphone, personal digital assistant), game controllers, tablet or slate computers, notebooks or laptop computers, netbooks, an electronic book reader devices, or a combination thereof.

Generally, a first device collects location information of a second device relative to the first device at least partly based on one or more direct communications between the first device and the second device. In one embodiment, such direct communication relies on sensors of the devices and is independent of any fixed infrastructure external to the devices. For example, such direct communication may include sending and/or receiving localized signals. The localized signals may be any signals that can be transmitted and received by the devices, such as audio signals or audio tones, ultra- or sub-sonic signals or tones, radio frequency signals (e.g., Bluetooth®, WiFi®, Zigbee®, etc.), infrared, combinations of any of the foregoing, or the like. Alternatively, the localized signals may include additional identification information identifying a sender of the localized signals In one example, the second device may emit a localized signal from a transmitter such as a speaker, which may be detected by multiple receivers such as mics at the first device. As the transmitters are located at different positions of the first device, there are differences of the localized signal received at the different mics at the first device. The first device may use such differences to obtain location information of the second device. For instance, the time-of-arrival (TOA) and/or signal amplitude differences or cues of the localized signal received at different mics of the first device may be combined with triangulation techniques to measure distance and angle values of the second device relative to the first device.

Additionally or alternatively, each device may use its accelerometer, gyroscope and/or digital compass to assist triangulation by resolving ambiguous positions, and identifying alignment regions when two devices might be well-positioned for triangulation at alignment regions. Outside the alignment regions, inertial displacement may be used to estimate position. The location information may include data, such as a rotation matrix from the accelerometer, gyroscope, and/or the digital compass.

The location information may include raw data such as the various differences of the received localized signals and/or data from the accelerometer and/or the digital compass. Alternatively, the location information may further include the calculated distance and angle values of one device relative to another based on such differences arising from processing of the raw data.

Additionally or alternatively, the first device may receive from the second device location information collected by the second device to assist in determining the relative location. In another embodiment, the first device and the second device may send some or all of their collected location information to a remote server separate from the devices for processing. However, even in this example, the receipt and collection of the location information may be performed locally by the devices.

For example, the devices may also exchange their location information in order to further improve the accuracy of their relative localization estimates.

In order to enable each device to track the other device's real-time movement, position estimates may be continuously collected or periodically collected within a preset period of time, and a filter (e.g., a Kalman filter) may be employed to smooth point samples and decrease measurement variance. The filter accounts for the various forms of measurement errors inherent in the phone-based triangulation.

The same or similar techniques may be performed in reverse for the second handheld device to obtain the relative location of the first handheld device.

Example Device Scenarios

Depending on the configurations such as number and types of sensors and localized signals used by the devices, there can be various embodiments to obtain the relative device-to-device localization.

For example, as noted above, the localized signals may include audio signals, ultra- or sub-sonic signals, radio frequency signals, infrared signals, and/or a combination thereof. The radio frequency signals may also include WiFi®, Bluetooth®, and Zigbee®. When the localized signals are audio signals or audio tones, the transmitter may be a speaker and the receiver may be a pair of mics. When the localized signals are other signals, the transmitter and receiver may be other equipment capable of sending and receiving such localized signals.

In one embodiment, the first device may be equipped with three or more transmitters or three or more receivers, not shown in the figures. One of ordinary skill in the art would appreciate that at least two transmitters or two receivers may be used to provide two-dimension (2D) position information of the second device relative to the first device, while three or more receivers (or three or more transmitters) on the first device may be used for passive three-dimension (3D) localization of the second device relative to the first device.

In another embodiment, the first device and the second device each are equipped with one transmitter, such as a speaker, and two receivers, such as mics. Exchanging each device's local 2D measurement legitimately doubles the number of 2D measurements per phone. Thus, as long as the 2D measurements are not coplanar, 3D positions may be resolved using only two transmitters and one receiver, or transmitter and two receivers at each device. Additional pair wise data exchange may be used in order to resolve the remaining ambiguity, as described below.

FIG. 1A illustrates two devices, a first device 102 and a second device 104, each of which may be implemented as any one of a variety of handheld or mobile computing devices such as those described above. The second device 104 may have a same or similar configuration as the first device 102 (e.g., both smartphones), or the first and second devices may be different (e.g., a smartphone and a tablet computer). In some embodiments, one of the first device 102 or the second device 104 may be a stationary computing device, such as a desktop computer, workstation, or game console, while the other of the devices is mobile relative thereto.

For purpose of brevity, unless specified otherwise, the following description is from the perspective of the first device 102 to obtain a localization of the second device 104 relative to the first device 102 based on a coordinate system of the first device 102. The same or similar techniques may be performed in reverse for the second device 104 to obtain localization of the first device 102 relative to the second device 104.

FIG. 1A illustrates an example overview of determining a location of the second device 104 relative to the first device

102, in which the devices each are equipped with one transmitter 106 and two receivers 108(1) and 108(2) (collectively referred to as 108). In FIG. 1A, the second device 104 sends localized signal(s) 110 to be received by multiple receivers 108 of the first device 102.

The techniques described below can also be extended or adapted for devices equipped with two transmitters and one receiver. For example, the first device 102 simultaneously sends the localized signal(s) 110 through multiple transmitters to be received by one receiver of the second device 104. The second device 104 may collect differences of multiple signals received by the second device 104 and then transmit such location information to the first device 102.

In the example of FIG. 1A, the first device 102 and the second device 104 are within a range of normal human social interaction. For example, the distance between the first device 102 and the second device 104 may be at most about 10 meters. The first device 102 is equipped with one or more sensors to collect location information of itself and the second device 104.

In the example of FIG. 1A, as many mobile phones already available on the market, the first device 102 is equipped with one transmitter 106, such as a speaker, and two receivers 108(1) and 108(2) such as mics. The first device 102 may collect location information of the second device 104 at least partly based on one or more communications received directly from the second device 104.

One or more localized signal(s) 110 sent by the second device 104 can be received by different receivers, such as the two receivers 108(1) and 108(2), at the first device 102. In the example of FIG. 1A, the localized signals may include audio signals or audio tones. However, as noted above, in other examples, other types of signals may additionally or alternatively be used.

The localized signal(s) 110 may be selected based on frequency response of the device's one or more transmitters and receivers. In one specific example, if the first device 102 is a Nexus One™ smartphone, the audio signal with a signal frequency of 2-4 kHz and duration of 25 ms may be chosen because long duration signals are more susceptible to error when the smartphone is moving. The selected 2-4 kHz, 25 ms signal is then modulated with a pair of 20-bit pseudo random codes using Binary Phase Shift Keying. The pseudo random code may be obtained in accordance with technologies such as those described in L. Girod, M. Lukac, V. Trifa, and D. Estrin, *A self-calibrating distributed acoustic sensing platform*, In SenSys, 2006.

When the second device 104 sends the localized signal(s) 110 to measure the relative localization, the first device 102 may also send the localized signal(s) 110 at different times or substantially the same time. The two localized signal(s) 110 sent by the first device 102 and the second device 104 respectively may be of the same nature or different natures. For example, the localized signal(s) 110 sent by the first device 102 and second device 104 respectively may be both audio signals. For another example, the localized signal(s) 110 sent by the first device 102 and second device 104 respectively may have different frequencies. For yet another example, the localized signal(s) 110 sent by the first device 102 may be audio signals while the localized signal(s) 110 sent by the second device 104 may be radio frequency signals. In one embodiment, the localized signal(s) 110 sent by the first device 102 and the second device 104 respectively may exhibit low cross correlation, which is lower than a threshold, and high auto correlation, which is higher than another threshold, such that if the two localized signal(s) 110 overlap, they can still be easily detected.

As the multiple receivers are located at different positions of the first device 102, there are various differences of the localized signal received at the different receivers. The differences may include a time-of-arrival (TOA) difference and a signal amplitude difference of the received signals, for example. The collected location information may include such differences.

Alternatively or additionally, the one or more sensors installed on the first device 102 may further include one or more sensors capable to detect orientation. Such sensors installed on the first device 102 may include an accelerometer, a compass, a gyroscope, or a combination thereof.

For example, in FIG. 1A, such sensors include an accelerometer 112 and/or a compass 114 such as a digital compass to measure an acceleration or change of direction of the first device 102. In some other embodiments, such sensors may include a gyroscope (not shown in FIG. 1A).

The collected location information may also include data from the one or more sensors capable to detect orientation to resolve ambiguous positions. For example. The accelerometer and/or the digital compass data may also be used to identify alignment positions that the first device 102 and the second device 104 may be well-positioned for triangulation based on the various differences of the received localized signals.

The alignment position is the orientation of the first device 102 relative to the orientation of the second device 104. Some positions between the first device 102 and the second device 104 are favorable in that they allow for more accurate localization based on the audio signals, whereas other positions are less favorable in that the errors tend to be larger when relying on audio-based localization. For example, the alignment position may be a predetermined orientation and a predetermined proximity between the first device 102 and the second device 104. The predetermined orientation and predetermined proximity is preset such that the error of accuracy is within a preset threshold.

For example, location information arising from the accelerometer 112 and/or the compass 114 may be combined with location information arising from the transmission of localized signals to resolve to a 3D position of the second device 104 relative to the first device 102.

For another example, the localization arising from the localized signals alone may not perform well in some situations such as when the transmitter from the second device 104 and the receivers from the first device 102 are facing away from each other and/or are attenuated by an object. Therefore, in some embodiments, the assistance of accelerometer 112 and the compass 114 may be engaged for tracking relative positions in these regions. However, in other embodiments, the localized signals alone may be sufficient to perform real-time relative device localization.

The same or similar information collecting process concurrently occurs at the second device 104.

The first device 102 and the second device 104 may exchange their respectively collected location information arising from various sensors to calculate distance values and local angles. The local angle measurement together and the rotation matrix obtained may be transmitted to the other device.

In the example of FIG. 1A, each of the devices, such as the first device 102, may further include one or more modules such as a collection module 116, an information exchange module 118, and a calculation module 120 to collect and process the location information.

The modules may be in the form of computer executable instructions, hardware, or a combination thereof. For example, the modules may be computer executable instructions that are executable by one or more processors 122 and stored on a memory 124 of the first device 102.

The memory 124 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The collection module 116 collects the location information of the first device 102 and/or the second device 104 from the various sensors including the transmitters 108(1) and (2), the accelerometer 112, and the compass 114.

The information exchange module 118 sends part or all of the location information collected by the first device 102 to the second device 104 and/or receives from the second device 104 part or all of the location information collected by the second device 104. For example, depending on a number of transmitters and/or receivers installed on the first device 102 and/or the second device 104, the first device 102 and second device 104 may exchange their respective collected location information.

The calculation module 120 of the first device 102 calculates a relative 3D position of the second device 104 based on the collected location information and/or the received location information from the second device 104. The first device 102 may continuously or periodically collect location information of the second device 104 over a period of time, track 3D position of the second device 104 relative to the first device 102, and thus store or maintain a real-time 3D localization of the second device 104 relative to the first device 102.

In the example of FIG. 1A, the first device 102 uses its calculation module 120 to calculate the localization based on computing functionality of its processor(s) 122, such as a central processing unit (CPU).

The processor(s) 122 may also include one or more specialized processors, a graphic processing unit (GPU), or other processors capable for computing functionality. It is feasible to recode the correlation algorithm for calculation. For example, dedicated digital signal processing (DSP) hardware could perform correlation calculations at line speeds for all variety of radio signals on modern devices.

In one embodiment, one of the devices with higher computing functionalities than the others may be allocated with all or a greater amount of computation than the other devices. For example, the first device 102 and the second device 104 may communicate with each other and allocate the computing operations among them depending on their computing facilities. If the first device 102 is equipped with more powerful hardware such as the processor(s) 122, the first device 102 may undertake more or all of the computing operations and transmit the calculation result of the relative localization of the first device 102 to the second device 104.

Figure 1B:
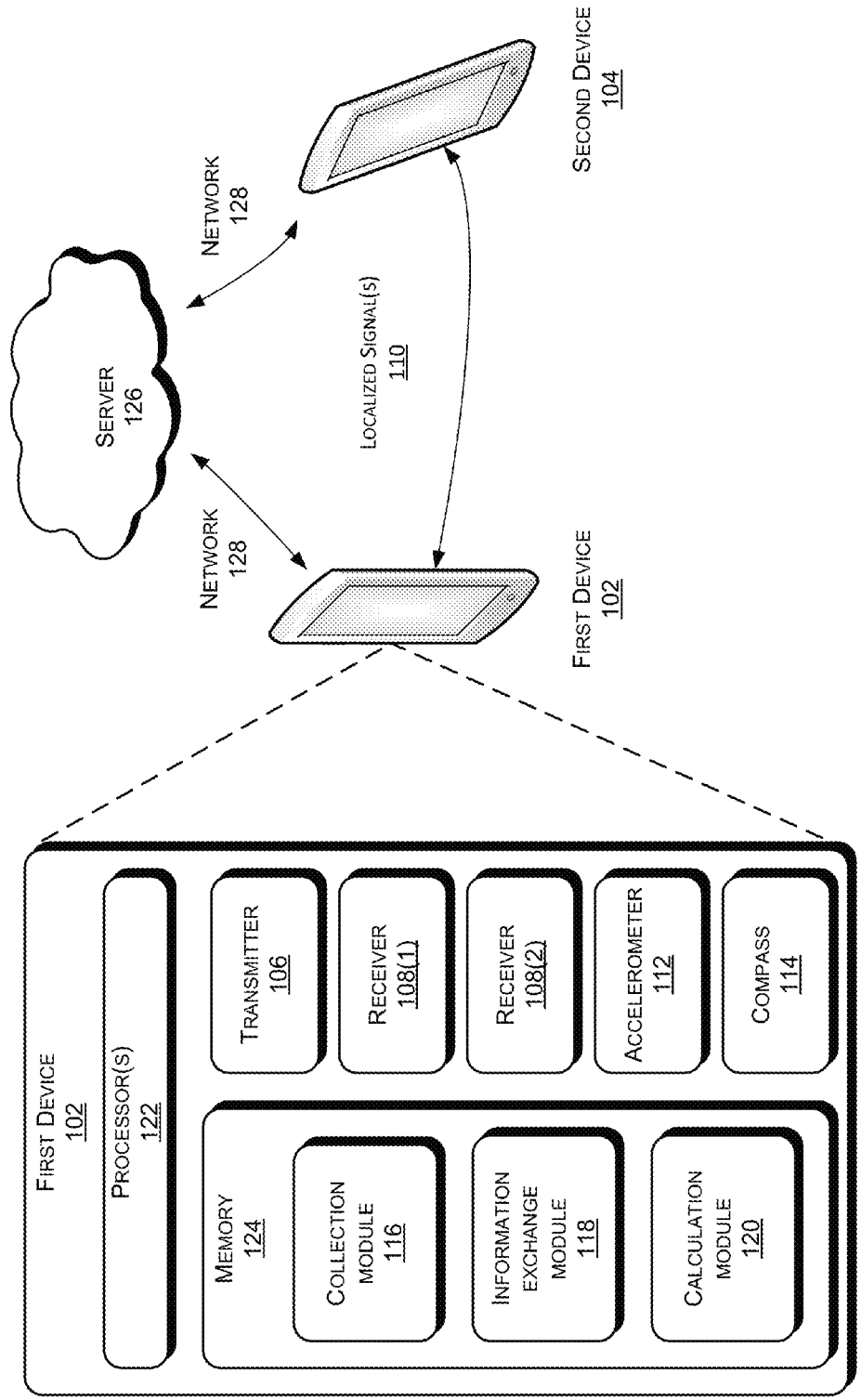
FIG. 1B illustrates an example overview of determining the location of one device relative to another, in which a server performs calculation of the relative locations of the devices.

Alternatively, as shown in FIG. 1B, some or all computing operations may be performed by a server 126 separate from the first device 102 and the second device 104. For example, the first device 102 and the second device 104 may send their respective location information to the server 126, such as a cloud server, through a network 128.

The network 128 may be a wireless network, a wired network, or a combination of wired and wireless networks. The server 126 may perform location calculations based on location data received and/or collected by the devices 102 and 104. The first device 102 and the second device 104 then receive the results from the server 126. Additionally or alternatively, there may be another computing device, not shown, such as a relay server that transmits data between the devices 102 and 104 and the server 126.

The benefit of allocating some or all of the calculation to the server 126 or a GPU available at the device 102 is to increase the speed of the calculations. This is particularly true because the bulk of the position calculation time is spent on correlation calculation, which is readily parallelizable.

For example, the recorded audio tones may be split into multiple pieces, and the correlation of each piece can then be calculated in parallel, utilizing multiple (such as the first device 102 and/or the server 126) computing facilities. Upon completion of calculating individual pieces, the results may be recombined in a straightforward manner to find the peak correlation.

The disclosed techniques may, but need not necessarily, be implemented between two devices. In another embodiment, there may be three or more devices. The first device 102 may localize a relative 3D position of any or all of the multiple devices using any of the techniques described herein. There may be various implementations to realized device-to-device localization among three or more devices.

For example, the first device 102 may be equipped with two or more sets of receivers and transmitters. A first set of receivers and transmitters may include two receivers and one transmitter or one receiver and two transmitters to collect location information of a second device. A second set of receivers and transmitters may include two receivers and one transmitter or one receiver and two transmitters to collect location information of a third device.

For another example, each device may be assigned its own unique localized signal. The localized signals may carry an identification identifying the device that sends the signal. The first device 102 may identify the relative localization of each device depending on identification of the received localization signals. For instance, the identification may be a unique identifiable audio tone. For another instance, the identification may be an identification message embedded in the signal, such as an identification of the device that sends the signals.

Example methods for performing techniques described herein are discussed in detail below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Example Techniques for Finding Relative 3D Position

For convenience, the techniques below are described in the context of the first device 102 equipped with one speaker and two microphones that is capable of sending and receiving audio signals. In some embodiments, the first device 102 is also configured with the accelerometer 112 and the compass 114. However, the techniques described herein are not limited to implementation in this environment. Unless specified otherwise, one of ordinary skill in the art can apply or extend the techniques described here to other configurations of signals, transmitters, and receivers.

In one embodiment, the localization scheme for finding relative 3D position may comprise a primary mode supplemented with a fallback mode. The primary mode may use the receivers available on the devices. The fallback mode includes inertial measure unit (IMU)-based displacement tracking and may use the accelerometer 112 and/or the compass 114.

The two modes, the primary mode and the fallback mode, may be employed at different times, depending on how the first device 102 and the second device 104 are oriented relative to one another. Specifically, the primary mode is used whenever the first device 102 and the second device 104 are in each other's alignment region. The alignment region or position is a predetermined orientation and a predetermined proximity between the first device 102 and the second device 104.

This alignment region corresponds to periods in which the two devices' speakers and microphones are facing each other. In contrast, the fallback mode may be activated whenever the two devices are outside the alignment region. In the primary mode, the calculation technique, such as the triangulation technique, may be based on the location information derived from direct signal transmissions between the devices, such as TOA and amplitude differences of the received localized signals. Each of TOA and Amplitude contributes to its own individual angle estimate. In some implementations, these angle estimates may be later combined.

Figure 2:
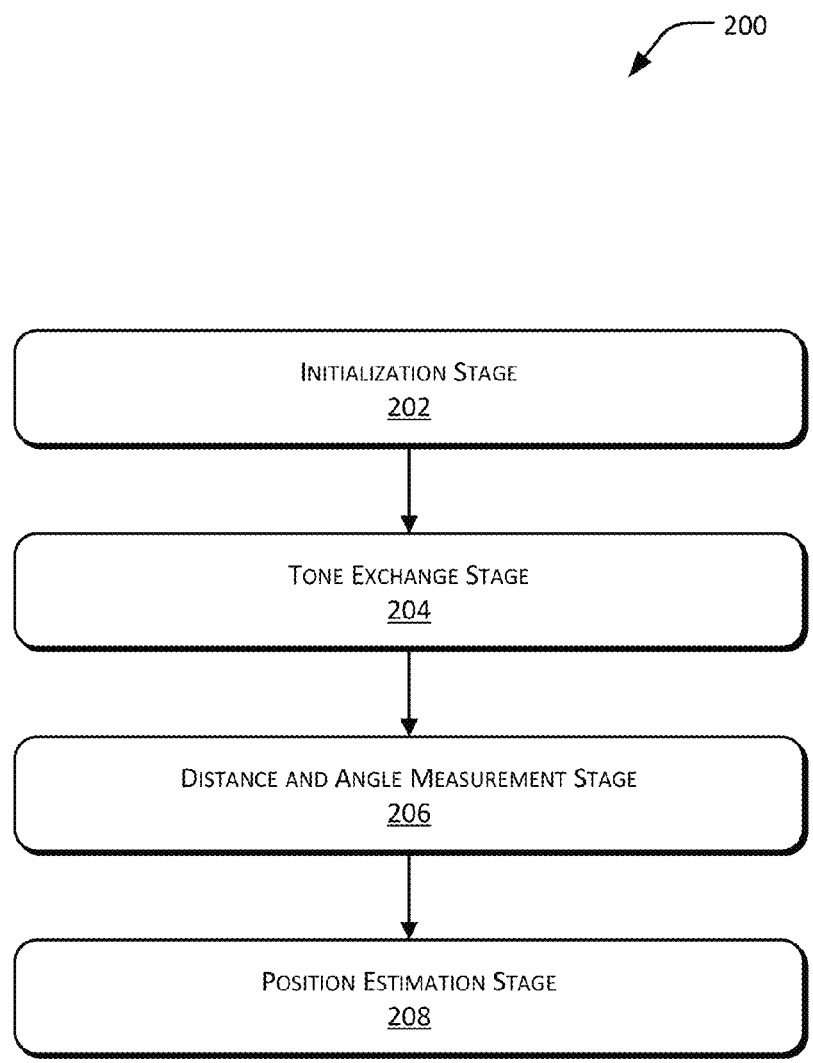
FIG. 2 illustrates a flowchart of an example protocol in a primary mode that the localization is based on location information arising from transmission of localized signals.

FIG. 2 illustrates a flowchart 200 of an example protocol in the primary mode. The primary mode starts off by executing an initialization stage 202. The protocol then switches to continuously iterating through a tone exchange stage 204, a distance and angle measurement stage 206, and a position estimation stage 208.

At the initialization stage 202, the first device 102 and the second device 104 establish a time synchronization such as a loose time synchronization. For example, the first device 102 and the second device 104 may calculate a WiFi round trip time and exchanging local clock values.

At the signal exchange stage 204, one of the two devices, such as the first device 102, opens its two microphones, such as the receivers 108(1) and 108(2), to be ready to receive signals, and sends a signal such as a "start" message to the second device 104. Upon receiving "start," the second device 104 replies with a "confirm" message, opens its microphones for recording, and sends an audio tone as soon as its microphones are opened. After receiving the "confirm" message, the first device 102 schedules its time to send its localized signals, such as an audio tone, through its speaker 106(1), based on the time sync information. Microphones on both devices are closed after the first device 102 finishes sending its audio tone. During this stage, both devices may also sample their accelerometer and geomagnetic sensors to obtain a rotation matrix.

At the distance and angle measurement stage 206, the recorded tones are first correlated with reference tones to compute raw TOA cues. Then the first device 102 and the second device 104 exchange their TOA cues to calculate distance values and local angles. The local angle measurement together and the rotation matrix obtained in the previous stage are transmitted to the other device.

At the position estimation stage 208, the distance measurement, angle values and rotation matrices are fed to a filter such as a Kalman filter to estimate the other device's relative 3D location coordinates.

Figure 3:
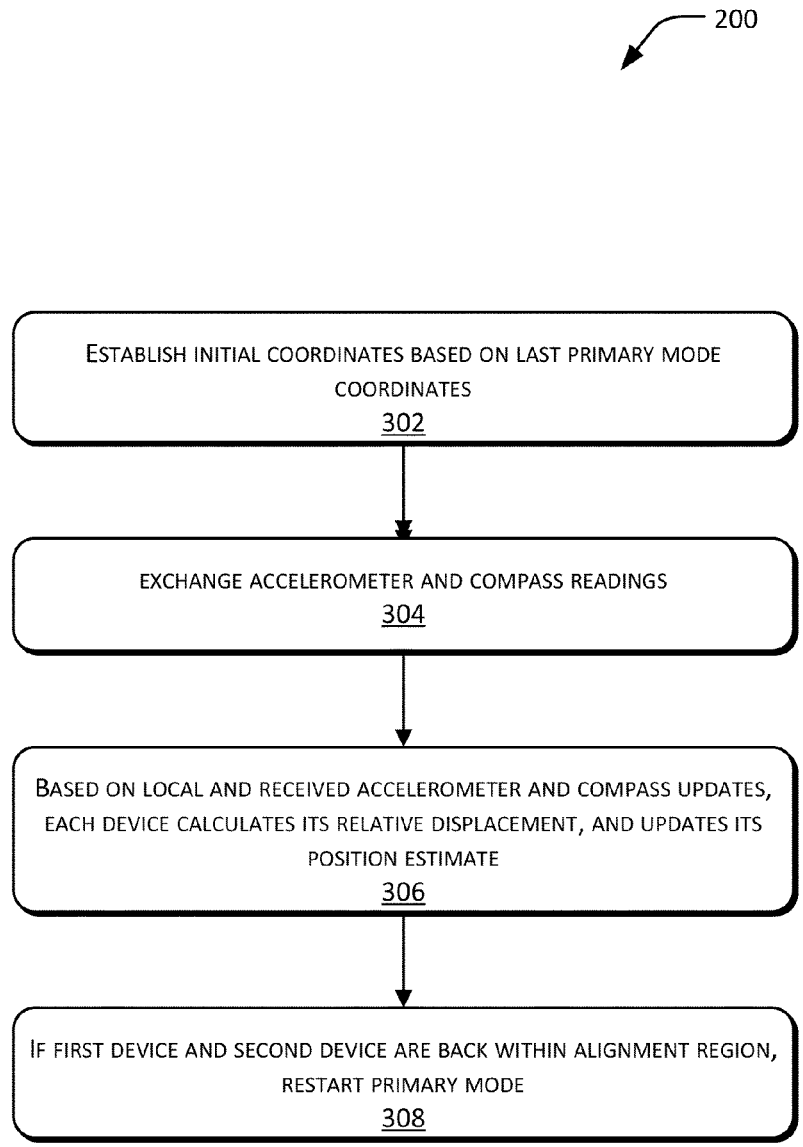
FIG. 3 illustrates a flowchart of an example protocol in a fallback mode to track a displacement of the device based on location information arising from an accelerometer and/or a compass.

FIG. 3 illustrates a flowchart 300 of an example protocol in the fallback mode.

When the first device 102 detects that the relative position of the second device is not near the alignment region, the protocol switches from primary mode to fallback mode. Fallback mode has two objectives: (1) to provide location estimates while the two devices are not in the alignment region, and (2) to detect when the two devices have re-entered each other's alignment region. Both of these objectives are accomplished by continuously or periodically calculating the displacement of each device with accelerometer and compass readings. In one embodiment, the fallback mode operates as follows.

At 302, the initialization establishes initial coordinates based on the last primary mode coordinates.

At 304, the first device 102 and the second device 104 exchange accelerometer and compass readings.

At 306, based on locally collected and received accelerometer and compass updates, each device calculates its relative displacement, and updates its position estimate.

At 308, if the first device 102 and the second device 104 are back within the alignment region, the primary mode as described above is restarted.

Details of the primary mode and fallback mode will be discussed in details below.

Example Static Localization

In this section, the basic positioning mechanism is derived by assuming that the devices are static, i.e., they do not move. The position mechanism first considers localization information for the simpler 2D problem, which will then serve as building blocks for the solution to the full-fledged 3D case. In the primary mode, in one embodiment, the triangulation technqiue may be based on two pieces of location information: TOA and amplitude difference. Each of TOA and amplitude difference contributes to its own individual angle estimate. These angle estimates are later combined.

Figure 4:
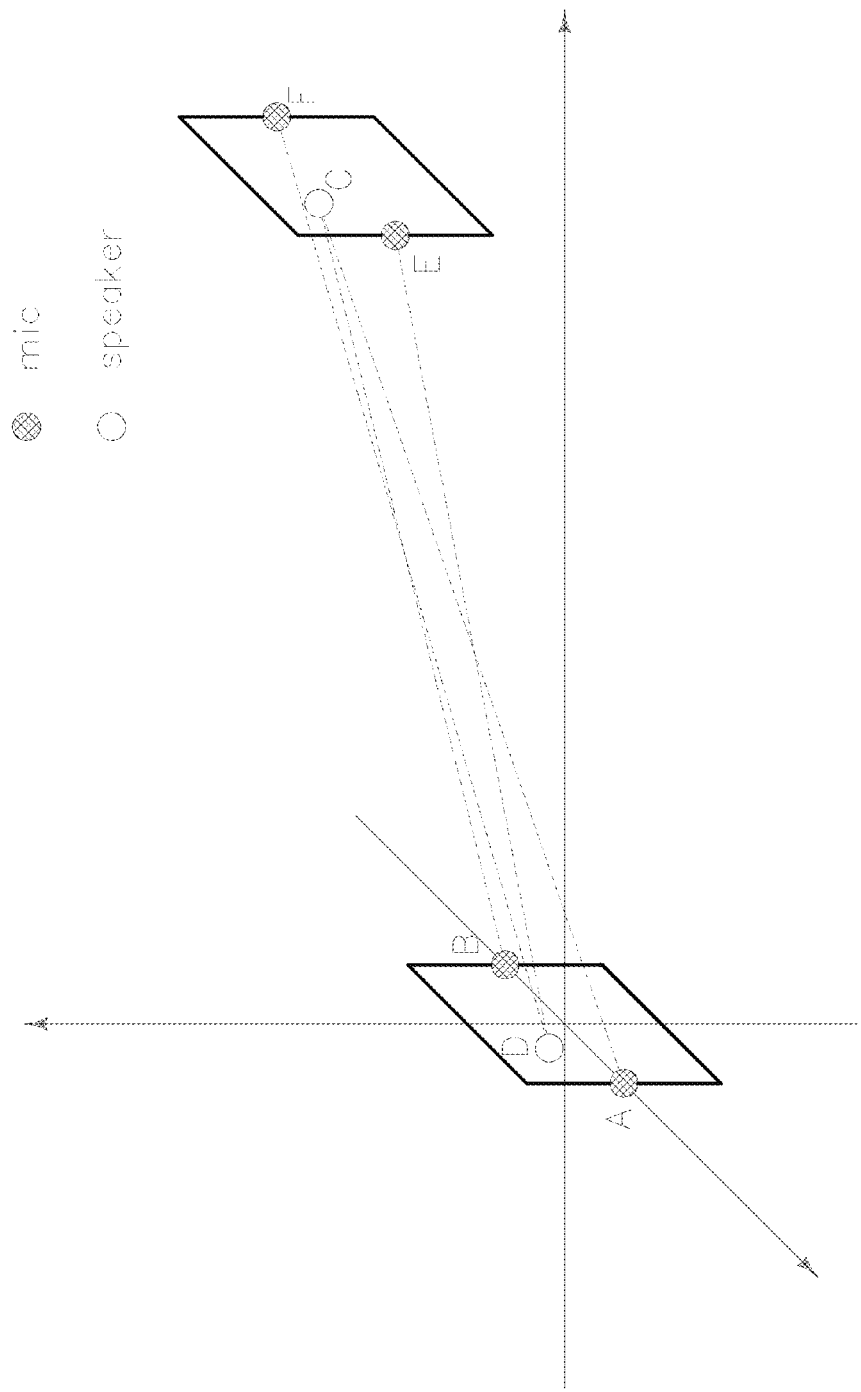
FIG. 4 illustrates an example triangulation technique usable to determine a location of the first device relative to the second device.

FIG. 4 illustrates an example coordinate system of the first device 102 to obtain the location information regarding TOA difference. The two microphones of the first device 102 are respented as point A and point B respectively. The speaker of the first device 102 is represented as point D. The two microphones of the second device 104 are respented as point E and point F respectively. The speaker of the second device is represented as point C.

Four distances for each pair of mic-speaker combinations can be obtained.

$$d_1=AC+DE \quad d_2=AC+DF$$

$$d_3=BC+DE \quad d_4=BC+DF$$

While these equations cannot be sovled for any individual mic—speaker distance, the difference of two mic—speaker distances for microphones hosted on the same device:

$$DE - DF = \frac{d_1 - d_2 + d_3 - d_4}{2} \quad (1)$$

$$AC - BC = \frac{d_2 - d_3 + d_1 - d_4}{2} \quad (2)$$

Figure 5:
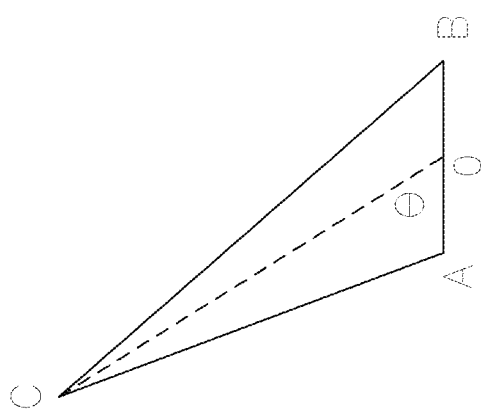
FIG. 5 illustrates an example triangle formed by two microphones on the first device and a speaker on the second device.

FIG. 5 illustrates an example triangle formed by the two microphones A and B on the first device 102 and the speaker C on the second device 104.

Let O be the point that bisects AB, and let θ be the angle ∠COA. The distance between the two mics AB is fixed by the geometry of the phone.

θ is derived by using the distance measurements above. From the law of cosines, it follows that $$\cos(\theta) = \frac{AO^2 + OC^2 - AC^2}{2AO \cdot OC}$$

$$\cos(\pi - \theta) = -\cos(\theta) = \frac{BO^2 + OC^2 - BC^2}{2BO \cdot OC}.$$

Combining these equations, and solving for θ yields $$\theta = \arccos \frac{(BC - AC)(BC + AC)}{AB \cdot (2 \cdot OC)} \approx \arccos \frac{BC - AC}{AB},$$

where BC+AC is approximated as twice OC. This approximation is accurate when AB is small relative to OC, which is typically the case as the distance to the remote phone is much greater than between the mics on the local phone.

The algorithm uses a similar computation for triangle DEF, resulting in an estimate for an angle φ, albeit in a potentially different 2D plane.

The idea of using amplitude difference as an additional cue stems from the observation that the received acoustic signal of the contralateral mic experiences greater attenuation than that of the ipsilateral mic. This amplitude difference in attenuation is used as an additional indicator for the relative angle between the first device 102 and the second device 104.

There can be various techniques to obtain the amplitude difference.

For example, empirical measurements may be used to construct a lookup table with the following attributes:

distance: measured distance.

amplitude_ratio: measured ratio of power of one microphone, such as the microphone A, to power of another microphone, such as the microphone B.

angle_mean: expected angle at the measured distance and power ratio.

angle_stddev: expected standard deviation of the expected angle. As part of each position estimation, the amplitude difference and distance are mapped to estimates of angle and standard deviation. These constitute the amplitude difference cue.

Figure 6:
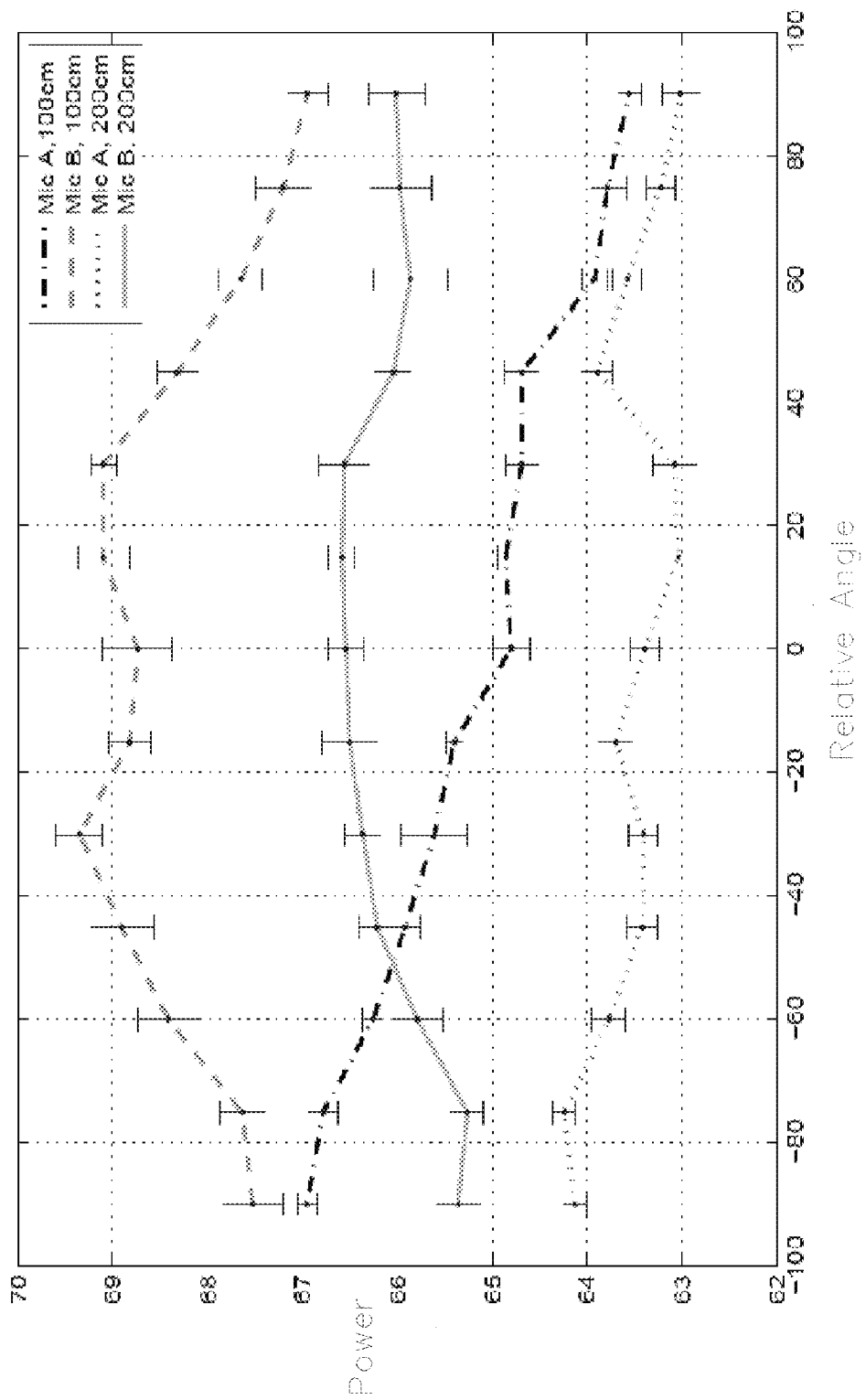
FIG. 6 illustrates an example signal amplitude reading measured at various azimuth angles usable to determine a location of the first device relative to the second device.
Figure 7:
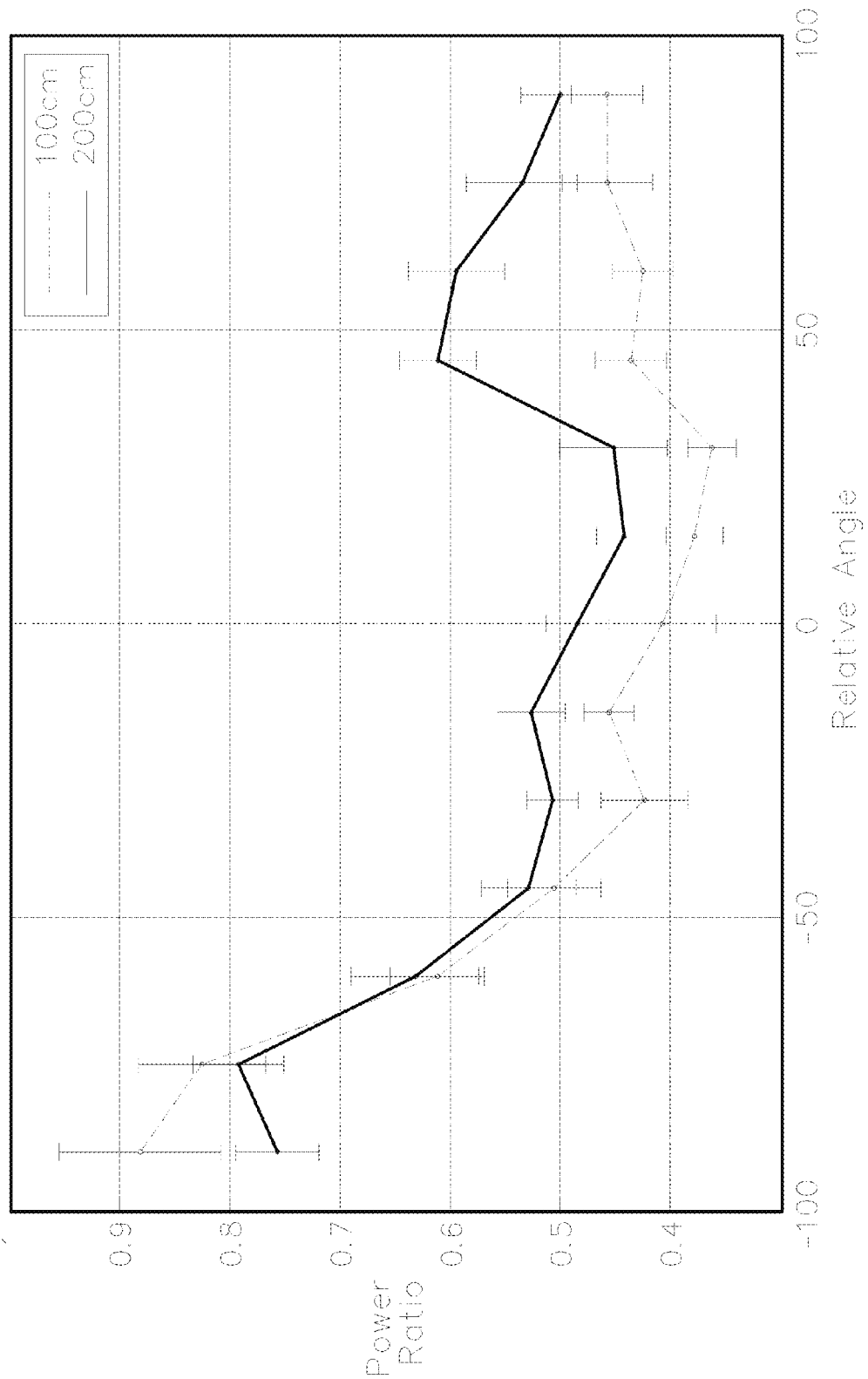
FIG. 7 illustrates the amplitude ratios corresponding to FIG. 6 usable to determine a location of the second device relative to the first device.

FIG. 6 illustrates an example signal amplitude reading measured at various azimuth angles. FIG. 7 illustrates the amplitude ratios corresponding to FIG. 6.

The non-injective relationship between angle and amplitude ratio means a given amplitude ratio is not definitively mapped to a unique angle. In order to resolve the ambiguity, each curve is partitioned into piecewise injective relations. For example, the power ratio at 1 m is represented by two relations: one from [−90,+15), and another from [+15,+75]. To use the appropriate piecewise relation, an angle estimate from the TOA cue is first calculated by the technique described above. The TOA cue's accuracy is not a concern here because it is only necessary to select among relatively large partitions in the angle space. Finally, the power information is mapped to an angle estimate.

Note that in principle, the lcoatio information may include additional cues for position estimation that could also be collected and used. For example, in another embodiment, one tempting cue is the spectral transformation information which is an important cue for human hearing localization. The high frequency component of an audio signal can be blocked by a human's head, resulting in a frequency difference of the received signal between the human's two ears. The spectrum difference is obvious when the wavelength of the high frequency component in the signal is much smaller than the size of the human's head.

The TOA and amplitude differences, and probably other location information previously discussed yield for each device's 2D angle information relative to this device's own coordinate system. The next step is now to combine these cues from both devices, and calculate each device's 3D position relative to another device. To do so, the angle calculated in one device, such as the second device 104, coordinate system may be translated to an angle in the other device, such as the first device 102, coordinate system.

Figure 8:
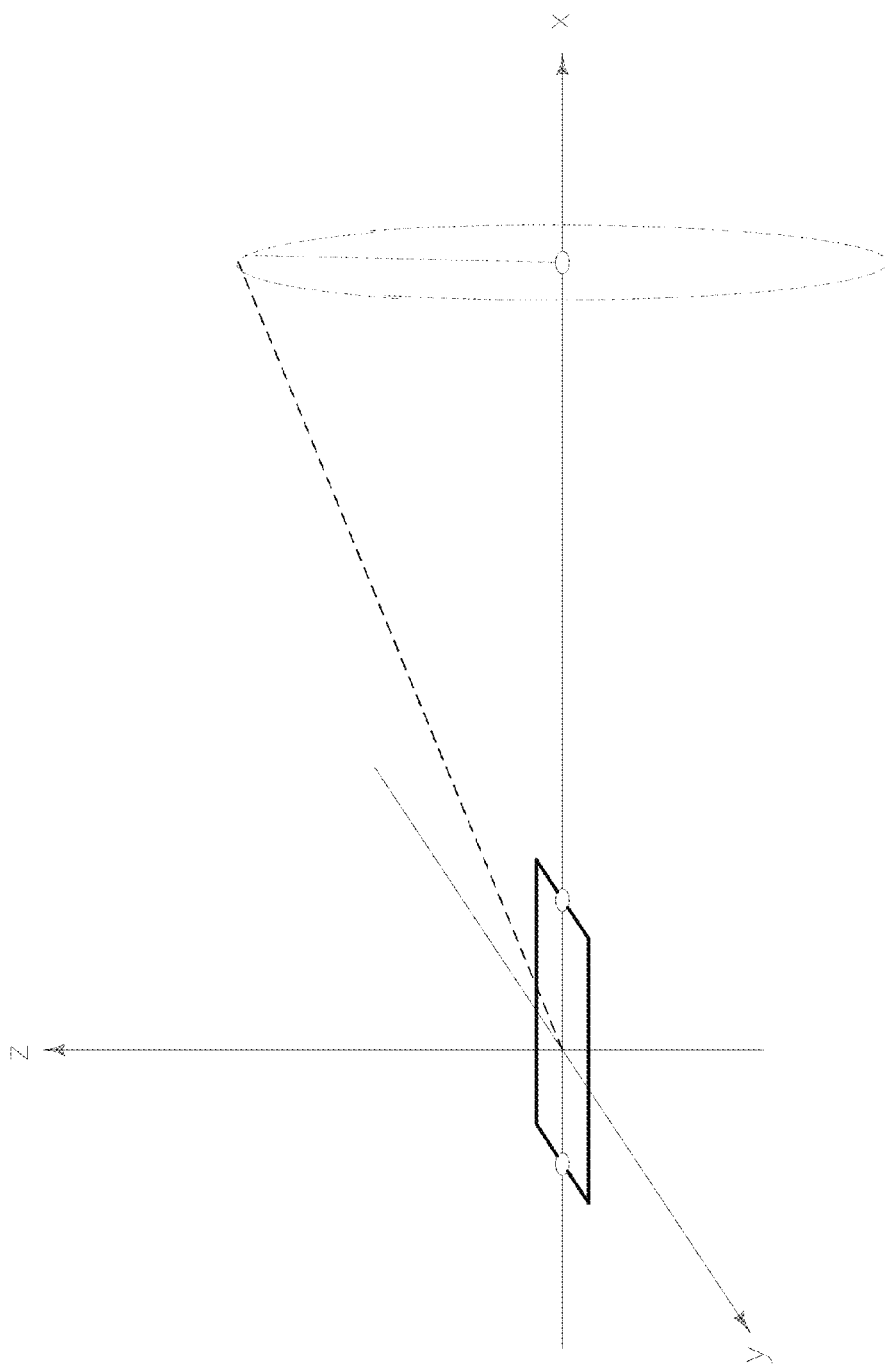
FIG. 8 illustrates an angle measurement usable to determine a location of the second device relative to the first device.

FIG. 8 illustrates an example first device 102's angle measurement usable to determine a location of the second device 104 relative to the first device 102. A single device, such as the device 102's angle measurement is ambiguous in determining a unique 3D location.

Let the two microphones of the first device 102 lie along the x-axis, and let the z-axis be normal to the face of the first device 102. The 2D angle θ calculated by the first device 102 and the measured distance d define a circle whose center is on the x-axis as shown in FIG. 8. This circle is the well-known cone of confusion; with one phone's measurements alone, the location of the remote phone is underconstrained and can lie at any point along the rim of the circle. Fortunately, with both devices' measurements and with additional sensor information, the ambiguity can be resolved.

Figure 9:
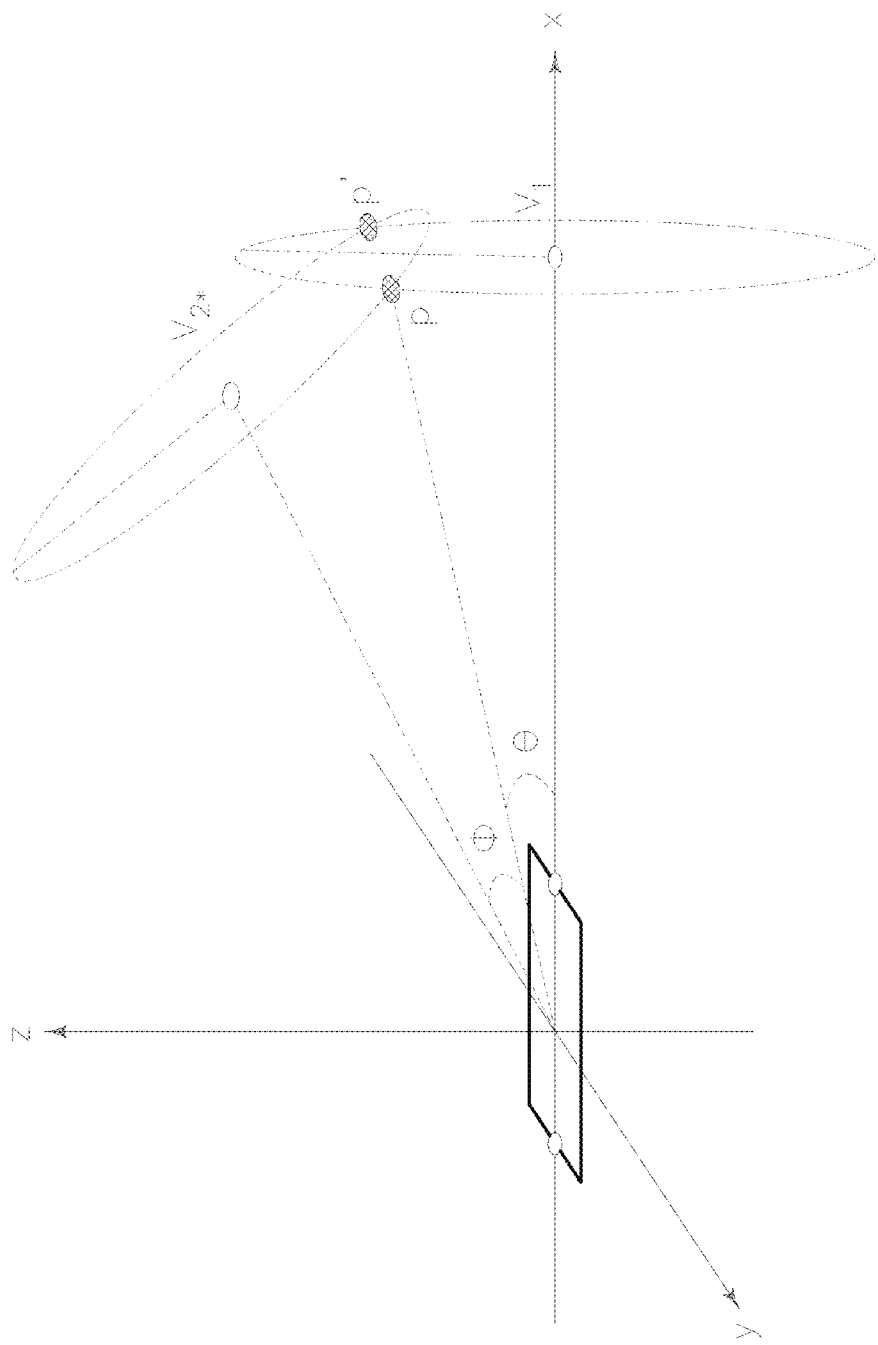
FIG. 9 illustrates an example mapping, in which the second device's angle is mapped to the first device's coordinate system, usable to determine a location of the second device relative to the first device.

FIG. 9 illustrates an example mapping that the second device 104's angle is mapped to the first device 102's coordinate system usable to determine a location of the second device 104 relative to the first device 102. Two possible positions p and p' may remain.

The coordinate of the center of the circle can be represented by a vector $\vec{v}_1 = (d \cos \theta, 0, 0)$. The radius of the circle is d sin θ. Thus the circle is determined by its center's coordinate and radius. Similarly, let the remote phone also define its own circle $\vec{v}_2 = (d \cos \phi, 0, 0)$ relative to its coordinate system, where $\phi$ is an angle in the remote phone's coordinate system.

The translation, which needs to map the mirror of $\vec{v}_2$ which is $\vec{v}_2^- = (-d \cos \phi, 0, 0)$ in the local device, i.e., the first device's coordinate system, is computed as follows. First, the rotation matrix R is used to map a vector in a device's coordinates to Earth coordinates. R is calculated by using data from gravity (accelerometer) and geomagnetic (digital compass) sensors. For example, if the first device 102 uses an Android™ operating systems, R is provided as a library function. The vector to represent the same circle on another device is:

$$\vec{v}^*_2 = R_1^{-1} R_2 \vec{v}_2^- \tag{3}$$

The vector is translated from the local device's coordinate system to Earth coordinate system using rotation matrix $R_2$, and then translated to the other device's coordinate system using rotation matrix $R_1$. This gives two circles on the local device's coordinate system, and their intersection point $\vec{p} = (p_x, p_y, p_z)$ is the coordinate of the remote device. FIG. 8 shows two circles: Circle 1 is given from $\vec{v}_1$ calculated with the local angle measurement, and Circle 2 is transferred from the remote phone.

Three equations are now obtained:

$$|\vec{p}| = d \tag{4}$$

$$\frac{\vec{p} \cdot \vec{v}_1}{|\vec{x}||\vec{v}_1|} = \cos\theta \tag{5}$$

$$\frac{\vec{p} \cdot \vec{v}_2^*}{|\vec{x}||\vec{v}_2^*|} = \cos\phi \tag{6}$$

In one embodiment, the coordinate $\vec{p}$ of the remote device may be obtained using a closed form method. Equation (5) is solved first and $p_x = d \cos \theta$ is obtained. $p_x$ is then substituted into equation (4) and (6). As long as the two devices' x-axis are not parallel to each other, a pair of $p_y$ and $p_z$ values can be obtained by solving these two equations. Since there are actually two intersection points of the two circles, the point with negative $p_z$ on one of the two phones' coordinate system can be eliminated based on each device's z-axis accelerometer. As shown in FIG. 9, $p_z$ both the two intersection points $\vec{p}$ and $\vec{p}'$ are positive in the local device's coordinate system. However, $p_z$ of $\vec{p}'$ is negative in the remote phone's coordinate system, hence $\vec{p}'$ is eliminated. The Equations (4)-(6) in a linear estimator model (Extended Kalman filter) for continuous localization described in the next section.

Example Substantially Real-Time Localization

The basic procedure for substantial real-time localization may takes sequential static position estimates continuously or periodically during a preset period of time or until the devices are out of a range of accurate detection where the accuracy is below a threshold. It is feasible to cope with changes in relative position by tackling the following additional challenges.

Figure 10:
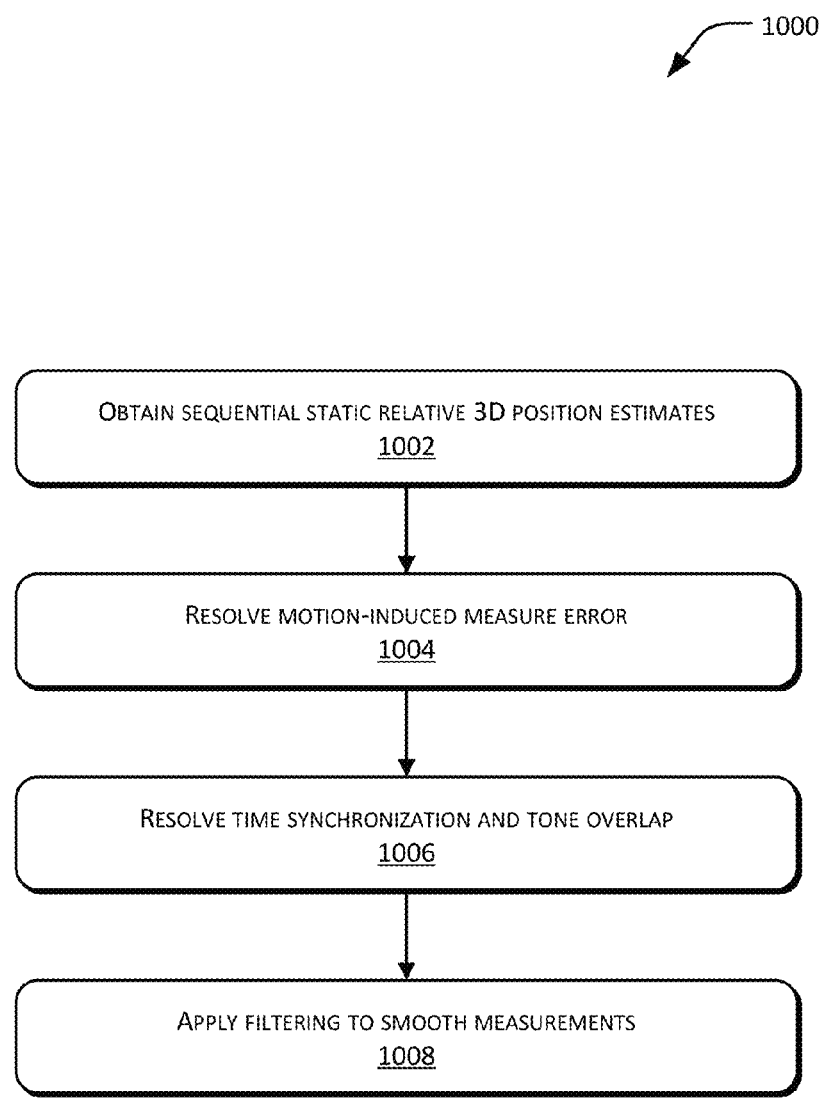
FIG. 10 is a flowchart of an example device-to-device relative localization technique.

FIG. 10 illustrates a flowchart 1000 of an example device-to-device real-time localization technqiue.

At 1002, sequential static relative 3D position estimates of the second device 104 are obtained.

At 1004, motion-induced measure error are resolved.

At 1006, a time synchronization and tone overlap is resolved.

At 1008, a filtering techinque is applied to smooth the measurements.

The static localization algorithm assumes that both devices are stationary during the exchange of audio tones. Referring to 1004, FIG. 11 illustrates the measurement error caused by translational and rotational movement during one-way audio tone exchange. The error s is limited to the displacement of the phone in the intervening period between the reception of tone at the ipslateral microphone B and at the contralateral microphone A.

For translation motion shown in FIG. 11A, consider a tone that reaches B and A at time $t_1$ and $t_2$ respectively. Translation motion away from the tone between the time when the tone reaches B and when it reaches A causes the contralateral mic to receive the tone at position A' at time $t_3$. It is assumed that the distance to the remote phone dominates the distance between the mics AB, so $\theta' \approx \theta$, and that the line k tangent to $t_2$ at $x_3$ intersects A. Therefore, s can be calculated as:

$$s = d_{1'} - d_1 \approx l \cos \theta$$

where l is found by comparing the distance sound travels to the distance the phone travels in the interval $[t_1, t_3]$.

$$l = (d_{1'} - d_2) \frac{v_{translation}}{v_{sound}}$$

For rotation motion shown in FIG. 11B, the assumptions are continued from above. Specifically, it is assumed that $\angle A'AB$ is a right angle because the absolute separation between A and A' is small, providing $\theta'' \approx \theta' \approx \theta$. Also, it is assumed that $A'x_3$ is a reasonable approximation of the tone's arc at $t_3$. Therefore:

$$s = d_{1'} - d_1 \approx l \sin \theta$$

The practical consequences of movement error are limited due to slow human movement velocity relative to sound velocity. Table 1 shows the device movement velocity that would yield 1 degree of angle measurement error for various device orientations.

| velocity | orientation (degree) | | |
|---|---|---|---|
| (m/s) | 20° | 45° | 70° |
| Translation | | | |
| 1 m/s | 0.416 | 0.113 | 0.020 |
| 5 m/s | 2.200 | 0.574 | 0.100 |
| 10 m/s | 4.779 | 1.169 | 0.204 |
| 20 m/s | 12.58 | 2.436 | 0.420 |
| Rotation | | | |
| 1 m/s | 0.149 | 0.112 | 0.054 |
| 5 m/s | 0.731 | 0.555 | 0.268 |
| 10 m/s | 1.432 | 1.093 | 0.530 |
| 20 m/s | 2.755 | 2.127 | 1.031 |

By referring to 1004, there is a need to resolve the time synchronization and tone overlap.

In one embodiment, two techniques are used to minimize round trip time. First, the phones perform loose time synchronization once at initialization. Second, the first device 102 and the second device 104 exchange tones in close succession with partial overlap. The net result is a decrease in two-way tone exchange time to nearly that of one-way tone exchange time plus clock sync error.

For example, loose time synchronization may be performed as follows. The first device 102 and the second device 104 first exchange several pings with Carrier Sense Multiple Access (CSMA) backoff disabled to determine stack traversal plus WiFi round trip time. The device with the lower device id then sends its local clock value (again without CSMA backoff) to the device with the higher device id which adjusts its local clock by the appropriate offset minus estimated WiFi round trip time.

Once synchronized, the devices exchange tones at a fixed period and phase. Because the two directions of the audio exchange may overlap with one another, the tones are easy to detect despite interference. Tones with low cross-correlation (interference rejection) and high auto-correlation (pulse detection) are chosen.

Tone overlap does introduce the issue that the local device's signal may be strong enough to mask the envelope of the remote device, especially when the distance between the two devices is large. It will increase error of correlation measurement even though special tones are used. Such overlapping impacts both power cue extraction and TOA cue extraction. Therefore, in one embodiment, one approach is an adaptive one in which a gap period is inserted between tone starting times and adjust the gap based on the distance of the two devices and motion speed. When the distance of the two devices is small and the motion speed is fast, the gap is decreased as long as two tones can still be successfully detected. When the distance of the two devices gets longer, the gap is increased until there is no overlap. This trades off static accuracy for motion error sensitivity to achieve higher overall continuous localization accuracy.

Referring to 1008, the filtering may be used to smooth the measurements from TOA and power cues, and track the motion of the phone.

In one embodiment, an Extended Kalman Filter is used. The filter recursively updates its state of the phone's position, and adjusts the state based on the noisy outer measurements of angle and distance. The filter model is similar to the one proposed in D. Bechler, M. S. Schlosser, and K. Kroschel. *System for robust 3d speaker tracking using microphone array measurements*, In Intelligent Robots and Systems, 2004. Such technique is adapted to the TOA and power cues.

In this embodiment, the state contains remote device's position, velocity and acceleration on each axis of the local device's coordinate system. The state vector at time k is:

$s_k = [p_x \ p_y \ p_z \ v_x \ v_y \ v_z \ a_x \ a_y \ a_z]^T$, and the state estimation equation is:

$$s_k = As_{k-1} + w_{k-1}$$

where A is state transition matrix, and $w_k$ is a random variable representing the state update error.

The measurement vector z contains the distance between two devices d and two angles (one angle $\theta$ measured by the local device and another angle $\phi$ measured by the remote device). The measurement at time k is $z_k = [d, \theta, \phi]^T$. The relationship between state vector and measurement vector, which can be obtained using 3D coordinate transfer equation shown in equation (4)-(6), is nonlinear. Hence the measurement equation at time k be linearized as shown below to fit the Kalman filter model.

$$z_k = h(s_k^-) + H_k(s_k - s_k^-) + v_k$$

where the linearized matrix is $$H_k = \left[\frac{\partial h(s_k)}{\partial s_k}\right] s_k^-$$

$s_k^-$ denotes the estimated state before it is corrected by the measurement. The random variable $v_k$ represents measurement error, which gives error of distance and angle measurement. $w_k$ and $v_k$ are assumed to be Gaussian white noise and known a priori. Their covariance matrices are denoted as $Q_k$ and $R_k$, respectively. $Q_k$ is determined by standard deviation of updated state and state update speed. To obtain $Q_k$, it is assumed that the estimation noise comes from acceleration estimation error which then leads to velocity and distance estimation error.

$$Q_k = GG^T \sigma_a^2$$

where $$G = \left[\frac{\Delta t^2}{2} \ \frac{\Delta t^2}{2} \ \frac{\Delta t^2}{2} \ \Delta t \ \Delta t \ \Delta t \ 1 \ 1 \ 1\right]^T.$$

In the equations, $\sigma_a$ denotes the standard deviation of estimated acceleration, and $\Delta t$ denotes the time difference between two consecutive measurements.

$R_k$ can be obtained if the standard deviation of distance and angles measurements are known. Let the standard deviation of distance and two angles be $\sigma_d$, $\sigma_\theta$ and $\sigma_{100}$, respectively.

$$R_k = [\sigma_d \sigma_\theta \sigma_\phi]^T [\sigma_d \sigma_\theta \sigma_\phi]$$

To simplify the calculation in the problem, it is assumed that the angle and distance measurement errors and estimation error are independent Gaussian distributions.

Based on the two equations above, the Kalman Filter algorithm falls into two steps running recursively: predict step and correct step.

1. In predict step, a new state is updated based on state estimation equation, and an estimated error covariance matrix $P_k^-$ is obtained.

$$s_k^- = As_{k-1}$$

$$P_k^- = AP_{k-1}A^T + Q_k$$

2. In correct step, blending factor $K_k$ is calculated at first, then the state is corrected based on the measurement residual. Finally, the estimate error covariance matrix is updated.

$$K_k = P_k^- H^T (HP_k^- H^T + R_k)^{-1}$$

$$s_k = s_k^- + K_k(z_k - h(s_k^-))$$

$$P_k = (I - K_k H) P_k^-$$

Since there are multiple cues (TOA and amplitude), multiple angles measurements can be obtained at one time. For example, there are two approaches to combine these multiple measurements. One approach calculates a weighted angle at time k which then is fed into the Kalman filter. The weight of each cue is determined by the standard deviation of the angle calculated by the cue. Let $\alpha_P$ and $\sigma_P$ denote the angle measured by power and its standard deviation. Let $\alpha_T$ and $\sigma_T$ denote angle measured by TOA and its standard deviation. The weighting equation is shown as below.

$$\alpha_C = \frac{\sigma_T^2}{\sigma_T^2 + \sigma_P^2}\alpha_T + \frac{\sigma_P^2}{\sigma_P^2 + \sigma_T^2}\alpha_P \quad (7)$$

Another approach assumes that the angle measurement of each cue is obtained at different time point (k+Δ and k−Δ), then angles from different cues are all used during filtering process. The measurement error covariance matrix R could be re-calculated at each time an angle measured by different cue is used.

In one embodiment, the first approach is used to combine the measured angles by different cues which has lower time complexity.

Example Fallback Mode

When localization detects that the two devices' relative positions are outside the alignment position, the protocol is switched from the primary mode as described above to the fallback mode.

In one embodiment, the accelerometer 112 of the first device is sampled very frequently at 20-50 Hz. For example, the fallback mode may be used to quickly update position estimates based on initial position estimates of the local device, such as the first device 102 $p_1=(0,0,0)$ and the remote device, such as the second device 104 $p_2=(x_2, y_2, z_2)$. The accelerometer 112 and compass 114 updates $u_1=(a_1, c_1)$ and $u_2=(a_2, c_2)$ where a and c each comprises triples (x, y, z). The localization scheme assumes that $p_1=(0,0,0)$, and therefore:

$$p_{2'}=p_2+R_2^{-1}R_1 d(a_2)-d(a_1)$$

where $R_1$ and $R_2$ are Rotation Matricies as described above and $$d(a) = v\Delta T + \frac{1}{2}a\Delta T^2.$$

The initial velocity v is estimated by the state of Kalman filter at the initial position. With updated position $p_{2'}$, detection of the alignment region is performed. Let ρ be the empirically determined angle that defines the boundary of the alignment region. Let θ be the angle of $p_{2'}$ relative to the z-axis (recall the axes defined in fig.twocircles) in the plane defined by $p_{2'}$, mic A and mic B. Then the following formula is obtained:

$$\theta = \arcsin\frac{x_{2'}}{|p_{2'}|}$$

A comparison of θ>ρ serves to indicate whether the remote phone is outside the alignment region.

When switching between the primary mode and the fallback mode, there is a need to identify the alignment region.

The following describes an example systematic method to identify the optimal alignment region. The idea is to select a fallback mode or primary mode based on the expected error. The primary mode error is angle-dependent, whereas the fallback mode error is time-dependent. Specifically, the fallback mode error increases over time because of displacement measurement error accumulation. Fortunately, primary mode measurement is not subject to time-dependent error, and therefore any primary mode measurement acts as a new initial position for fallback mode. Therefore, the primary mode error is known from Equation (7), and the fallback mode error is known because the time is bounded between measurements according to the time synchronization and tone overlap as described above. For every angle θ, both expected primary and fallback error are precomputed. Past a certain angle ρ, the expected primary error will start to exceed the expected fallback error. At this point, the mode may be switched to fallback mode.

An indicator is defined as $I=e_{fallback}(n\Delta T)-\epsilon e_{primary}(\theta)$. $e_{fallback}(n\Delta T)$ denotes the position error after running fallback mode $n\Delta T$ time. It can be approximated by the standard deviation of acceleration $\sigma_a$ as $e_{fallback}\approx|\sigma_a^2(n\Delta T)^2/2|$. $e_{primary}(\theta)$ denotes the position error of primary mode at angle θ. It can also be obtained if the standard deviation $\sigma_\theta$ is known. If the indicator I has positive value, the phone is changed to fallback mode until I changes to positive.

While the above method identifies the one example alignment region, in one embodiment, a heuristic for simplicity may be used. For example, the primary mode is operated whenever the angles are between (are bet.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
receiving, by a first handheld device, one or more localized signals from a second handheld device;
determining, based at least in part on the one or more localized signals, a location of the second handheld device relative to the first handheld device, the location comprising at least one of a distance between the second handheld device and the first handheld device or angle values of the second handheld device relative to the first handheld device;
obtaining, at the first handheld device, sensor data from one or more sensors of the first handheld device, the one or more sensors including at least one of an accelerometer, a gyroscope, or a compass;
determining, based at least in part on the location of the second handheld device relative to the first handheld device and the sensor data, that the first handheld device is at an alignment position with the second handheld device, the alignment position including a predetermined orientation and a predetermined proximity between the first handheld device and the second handheld device when a microphone of the first handheld device faces a speaker of the second handheld device, and both the first handheld device and the second handheld device are moving.

2. A method as recited in claim 1, wherein the one or more localized signals are transmitted over a distance of at most 10 meters.

3. A method as recited in claim 1, further comprising:
receiving, by the first handheld device, one or more additional localized signals from the second handheld device at different times; and
determining, based at least in part on at least one of the one or more localized signals and the one or more additional localized signals, a three-dimension (3D) location of the second handheld device relative to the first handheld device due to a movement of at least one of the first handheld device or the second handheld device.

4. A method as recited in claim 1, further comprising:
transmitting, by the first handheld device, two or more localized signals to the second handheld device through two or more transmitters on the first handheld device, the two or more localized signals configured to be received by a receiver of the second handheld device to allow the second handheld device to determine a three-dimension (3D) location of the first handheld device relative to the second handheld device.

5. A method as recited in claim 1, further comprising receiving location information collected by the second handheld device.

6. A method as recited in claim 1, wherein the determining the location of the second handheld device relative to the first handheld device comprises:
sending, by the first handheld device, one or more packets comprising data representing the one or more localized signals to a server separate from the first handheld device and from the second handheld device, the server being configured to process the data representing the one or more localized signals to generate the location of the second handheld device relative to the first handheld device; and
receiving, by the first handheld device, the location of the second handheld device relative to the first handheld device.

7. A method as recited in claim 1, wherein the one or more localized signals further include one or more of:
an audio signal;
an ultra-sonic signal;
a sub-sonic signal;
a radio frequency signal; or
an infrared signal.

8. The method of claim 1, wherein determining the location of the second handheld device relative to the first handheld device based at least in part on the one or more localized signals is performed independent of a Global Positioning System (GPS) signal, a cellular network signal, or a WiFi signal.

9. A method as recited in claim 1, wherein the determining the location of the second handheld device relative to the first handheld device comprises determining at least one of:
a time-of-arrival (TOA) difference between the one or more localized signals being received at a first receiver of the first handheld device and a second receiver of the first handheld device; or
an amplitude difference between the one or more localized signals being received at the first receiver of the first handheld device and the second receiver of the first handheld device.

10. A method as recited in claim 9, wherein the determining the location of the second handheld device relative to the first handheld device comprises analyzing the TOA difference to triangulate the location of the second handheld device relative to the first handheld device.

11. One or more computer storage media, embodied in hardware, having stored thereupon a plurality of computer executable instructions that, when executed by one or more processors, cause the one or more processors to perform operations comprising:
determining whether a first device is at an alignment position with a second device, the alignment position including a predetermined angular orientation relative to the second device;
in response to determining that the first device is at the alignment position with the second device:
establishing a time synchronization between the first device and the second device;
receiving, by the first device, multiple localized signals from the second device, the multiple localized signals comprising at least one of multiple audio signals, multiple radio frequency signals, multiple ultrasonic signals, multiple sub-sonic signals, or multiple infrared signals; and
determining, by the first device and based at least in part on differences in reception of the multiple localized signals, at least one of a distance between the second device and the first device or angle values of the second handheld device relative to the first handheld device; and
in response to determining that the first device is not at the alignment position with the second device:
establishing a location of the second device relative to the first device when the first device is at the alignment position with the second device immediately before when the first device is not at the alignment position with the second device;
receiving, from the second device, a signal comprising information relating to a reading of a sensor of the second device that detects an orientation of the second device to resolve ambiguous positions; and
updating the location of the second device relative to the first device at least partly based on the information relating to the reading of sensor of the second device.

12. One or more computer storage media as recited in claim 11, further comprising:
in response to determining that the first device is not at the alignment position with the second device,
providing an estimate of the location of the second device relative to the first device based on data collected from an accelerometer and a compass of the second device; and
detecting when the first device is at the alignment position with the second device.

13. The one or more computer storage media as recited in claim 11, wherein the predetermined orientation is preset such that an error of localization accuracy is within a preset threshold.

14. One or more computer storage media as recited in claim 11, further comprising in response to determining that the first device is at the alignment position with the second device,
receiving another signal including additional location information collected by the second device; and
calculating the location of the second device relative to the first device based on the additional location information and the multiple localized signals.

15. One or more computer storage media as recited in claim 14, further comprising using a Kalman filter to smooth a result of the calculation.

16. A first handheld device comprising:
one or more receivers that receive one or more localized signals from a second handheld device;
memory storing one or more modules;
one or more processors operably coupled to the memory to execute the one or more modules to:
receive, by the first handheld device, one or more localized signals from a second handheld device;
determine, based at least in part on the one or more localized signals, a location of the second handheld device relative to the first handheld device, the location comprising at least one of a distance between the second handheld device and the first handheld device or angle values of the second handheld device relative to the first handheld device;

determine, based at least in part on the location of the second handheld device relative to the first handheld device, that a microphone of the first handheld device faces a speaker of the second handheld device, and both the first handheld device and the second handheld device are moving.

17. A first handheld device as recited in claim 16, further comprising:

one or more sensors that collect a rotation matrix of the first handheld device, the one or more sensors including at least one of an accelerometer, a compass, or a gyroscope; and the one or more processors operably coupled to the memory to execute the one or more modules to further determine whether the first handheld device and the second handheld device are at an alignment position based on data collected by the one or more sensors, the alignment position being a predetermined orientation and a predetermined proximity relative to the second handheld device.

18. A first handheld device as recited in claim 16, wherein determining the location of the second handheld device relative to the first handheld device comprises determining at least one of:

a time-of-arrival (TOA) difference between multiple received signals at different receivers of the first handheld device, the multiple received signals corresponding to one signal received from a transmitter of the second handheld device; or an amplitude difference between the multiple received signals.

19. A first handheld device as recited in claim 16, wherein the one or more processors are operably coupled to the memory to further execute the one or more modules to:

send data representing the one or more localized signals to a server separate from the first handheld device; and receive, from the server, the location of the second handheld device relative to the first handheld device, the location having been calculated by the server based on the collected location information.

20. The first handheld device of claim 16, wherein:

the one or more localized signals comprise multiple localized signals;

the one or more modules are further executable by the one or more processors to analyze the multiple localized signals to identify differences in reception strength of the multiple localized signals; and the determining that the microphone of the first handheld device faces the speaker of the second handheld device is further based at least in part on the differences in the reception strength of the multiple localized signals.

* * * * *